US010606377B1

(12) United States Patent
Huang

(10) Patent No.: US 10,606,377 B1
(45) Date of Patent: Mar. 31, 2020

(54) TOUCHPAD MODULE AND COMPUTING DEVICE USING SAME

(71) Applicant: PRIMAX ELECTRONICS LTD., Taipei (TW)

(72) Inventor: Tai-Sou Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/256,306

(22) Filed: Jan. 24, 2019

(30) Foreign Application Priority Data

Nov. 2, 2018 (TW) .............................. 107139013 A

(51) Int. Cl.
*G06F 3/0354* (2013.01)
*G06F 3/041* (2006.01)
*H05K 5/00* (2006.01)
*G06F 1/16* (2006.01)

(52) U.S. Cl.
CPC ........ *G06F 3/03547* (2013.01); *G06F 1/1643* (2013.01); *G06F 3/0414* (2013.01); *H05K 5/0017* (2013.01)

(58) Field of Classification Search
CPC .. G06F 3/03547; G06F 1/1643; G06F 3/0414; H05K 5/0017
See application file for complete search history.

(56) References Cited

U.S. PATENT DOCUMENTS

| 10,001,425 | B1* | 6/2018 | Olsson ................. G01M 3/005 |
| 10,401,920 | B2* | 9/2019 | Kitamura ................. G06F 3/02 |
| 10,488,954 | B1* | 11/2019 | Huang .................... G06F 1/169 |
| 10,522,307 | B1* | 12/2019 | Huang .................... H01H 21/04 |
| 2005/0052425 | A1* | 3/2005 | Zadesky ............... G06F 3/0338 345/173 |
| 2009/0046069 | A1* | 2/2009 | Griffin .................. G06F 1/1626 345/173 |
| 2010/0079404 | A1* | 4/2010 | Degner ............... G06F 3/03547 345/174 |
| 2010/0103129 | A1* | 4/2010 | Ling ..................... G06F 1/1616 345/173 |
| 2011/0018816 | A1* | 1/2011 | Liu ......................... G06F 1/169 345/173 |
| 2011/0291947 | A1* | 12/2011 | Pemberton-Pigott ....................... G06F 1/1643 345/173 |
| 2012/0182236 | A1* | 7/2012 | Tsai ........................ G06F 1/169 345/173 |

(Continued)

*Primary Examiner* — Ibrahim A Khan
(74) *Attorney, Agent, or Firm* — WPAT, PC

(57) ABSTRACT

A touchpad module includes a base plate, a touch member, a switch and a supporting assembly. The base plate includes a triggering part. The switch is disposed on the touch member and aligned with the triggering part. The supporting assembly is arranged between the base plate and the touch member, and includes an elastic element. The elastic element includes a first segment, a second segment and a bent structure. In response to an external force, the touch member is swung toward the base plate by using the supporting assembly as a fulcrum, so that the switch is contacted with the triggering part. Moreover, the first segment is correspondingly moved away from the second segment by using the bent structure as a fulcrum, so that there is a first angle between the first segment and the second segment.

11 Claims, 6 Drawing Sheets

(56) References Cited

U.S. PATENT DOCUMENTS

| | | | |
|---|---|---|---|
| 2014/0116868 A1* | 5/2014 | Tsai | H01H 23/12 |
| | | | 200/529 |
| 2014/0327653 A1* | 11/2014 | Schneider | G06F 3/016 |
| | | | 345/174 |
| 2015/0009156 A1* | 1/2015 | Hsueh | G06F 3/0202 |
| | | | 345/173 |
| 2019/0243475 A1* | 8/2019 | Huang | G06F 3/0416 |
| 2019/0385800 A1* | 12/2019 | Huang | G06F 1/1671 |

* cited by examiner

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in a casing 21 of the notebook computer 2. The touchpad module 1 is installed in the fixing frame 24. The touchpad module 1 comprises a supporting structure 11, a triggering part 12 and a touch member 13. The supporting structure 11 and triggering part 12 are located at two opposite sides of the fixing frame 24. The touch member 13 of the touchpad module 1 is connected with the supporting structure 11. Consequently, the touch member 13 of the touchpad module 1 may be swung relative to the triggering part 12 by using the supporting structure 11 as a fulcrum. The touchpad module 1 further comprises a switch 14. The switch 14 is located under the touch member 13 and aligned with the triggering part 12.

While the touch member 13 is pressed down by the user, the touch member 13 is swung downwardly relative to the triggering part 12 by using the supporting structure 11 as a fulcrum. When the switch 14 of the touchpad module 1 is pushed by the triggering part 12 of the fixing frame 24, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

However, the conventional touchpad module 1 still has some drawbacks. For example, the supporting structure 11 is connected with the upper component and the lower component through iron elements or plastic structures (e.g., sponge structures). Consequently, as the iron elements or plastic structures are subjected to deformation, the touch member 13 can be swung upwardly or downwardly. Due to the design of the supporting structure 11, the upward/downward swinging action of the touch member 13 is usually aslant and unstable.

Therefore, there is a need of providing an improved touchpad module in order to overcome the above drawbacks.

SUMMARY OF THE INVENTION

An object of the present invention provides a touchpad module including a supporting assembly, a touch member and a base plate. The supporting assembly includes an elastic element. The elastic element is produced by bending a metal plate. Consequently, the touch member can be stably swung relative to the base plate by using the supporting assembly as a fulcrum.

Another object of the present invention provides a computing device with a touchpad module. The touchpad module includes a supporting assembly, a touch member and a base plate. The supporting assembly includes an elastic element. The elastic element is produced by bending a metal plate. Consequently, the touch member can be stably swung relative to the base plate by using the supporting assembly as a fulcrum.

The other objects and advantages of the present invention will be understood from the disclosed technical features.

In accordance with an aspect of the present invention, there is provided a touchpad module for a computing device. The computing device includes a fixing frame. The touchpad module includes a base plate, a touch member, a switch and a supporting assembly. The base plate is disposed within the fixing frame, and includes a triggering part. The touch member is disposed within the fixing frame. The touch member and the base plate are opposed to each other. The switch is disposed on the touch member and aligned with the triggering part of the base plate. The supporting assembly is arranged between the base plate and the touch member, and includes an elastic element. The elastic element includes a first segment, a second segment and a bent structure between the first segment and the second segment. In response to an external force, the touch member is swung toward the base plate by using the supporting assembly as a fulcrum, so that the switch is contacted with the triggering part. While the touch member is swung toward the base plate, the first segment of the elastic element is correspondingly moved in a direction away from the second segment of the elastic element by using the bent structure as a fulcrum, so that there is a first angle between the first segment and the second segment.

In accordance with an aspect of the present invention, there is provided a computing device. The computing device includes a casing, a processor and a touchpad module. The fixing frame is concavely formed in the casing. The processor is disposed within the casing. The touchpad module is disposed within the casing and electrically connected with the processor. The touchpad module includes a touchpad module for a computing device. The computing device includes a fixing frame. The touchpad module includes a base plate, a touch member, a switch and a supporting assembly. The base plate is disposed within the fixing frame, and includes a triggering part. The touch member is disposed within the fixing frame. The touch member and the base plate are opposed to each other. The switch is disposed on the touch member and aligned with the triggering part of the base plate. The supporting assembly is arranged between the base plate and the touch member, and includes an elastic element. The elastic element includes a first segment, a second segment and a bent structure between the first segment and the second segment. In response to an external force, the touch member is swung toward the base plate by using the supporting assembly as a fulcrum, so that the switch is contacted with the triggering part. While the touch member is swung toward the base plate, the first segment of the elastic element is correspondingly moved in a direction away from the second segment of the elastic element by using the bent structure as a fulcrum, so that there is a first angle between the first segment and the second segment.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
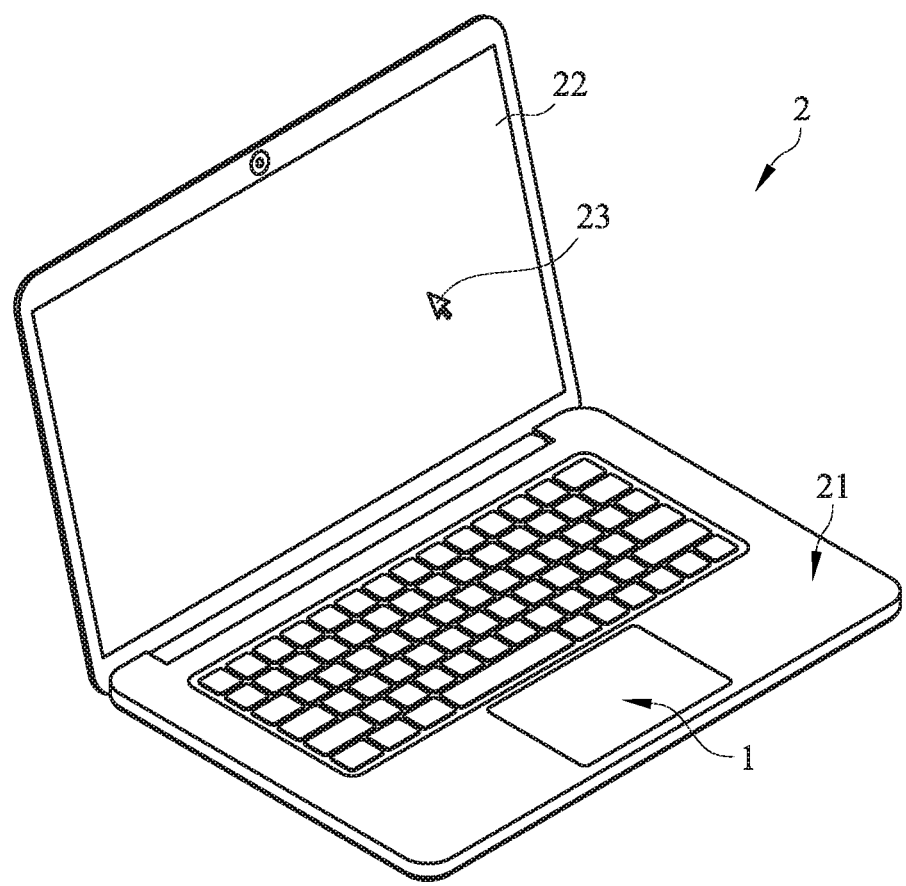
FIG. 1 schematically illustrates a conventional notebook computer with a touchpad module.
Figure 2:
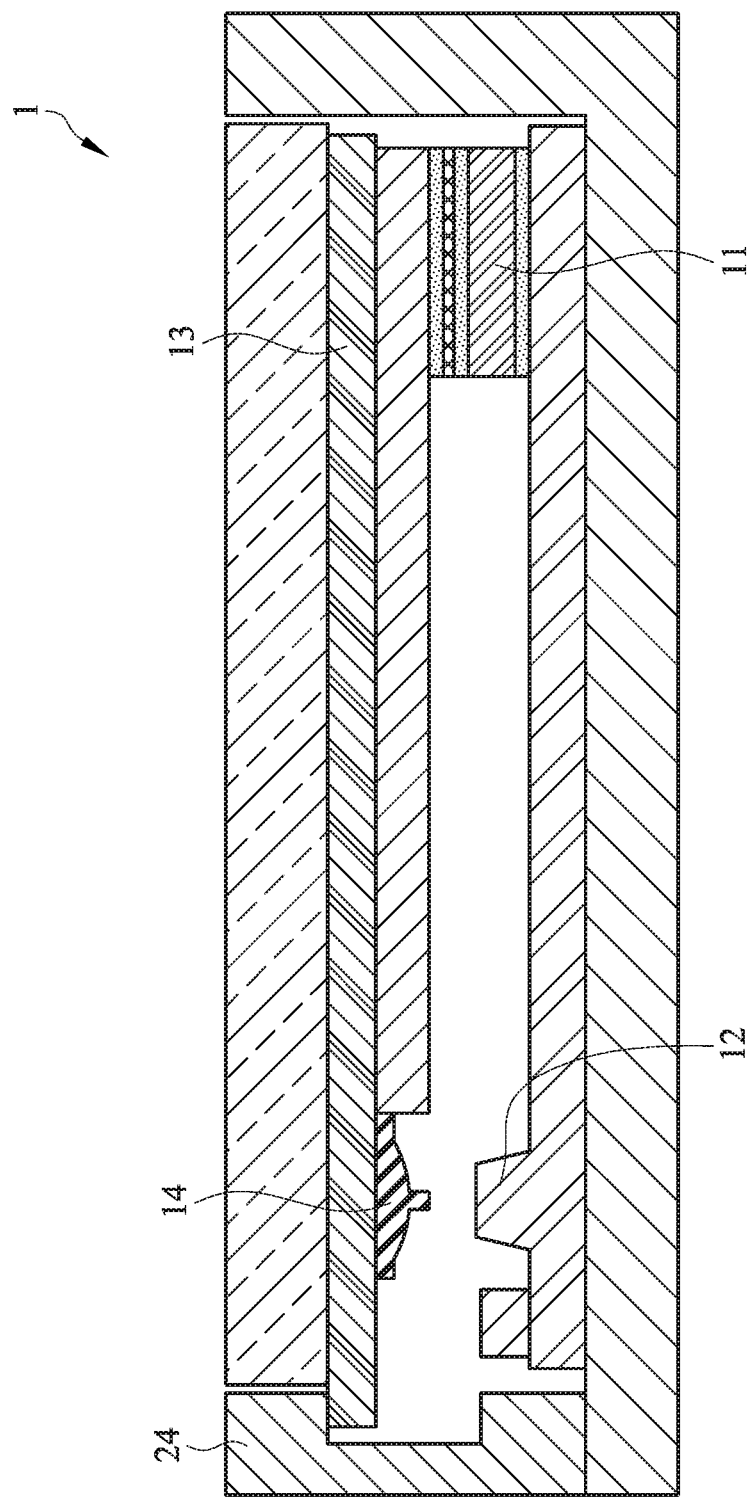
FIG. 2 is a schematic cross-sectional view illustrating the touchpad module as shown in FIG. 1, in which the touchpad module is not pressed down.
Figure 3:
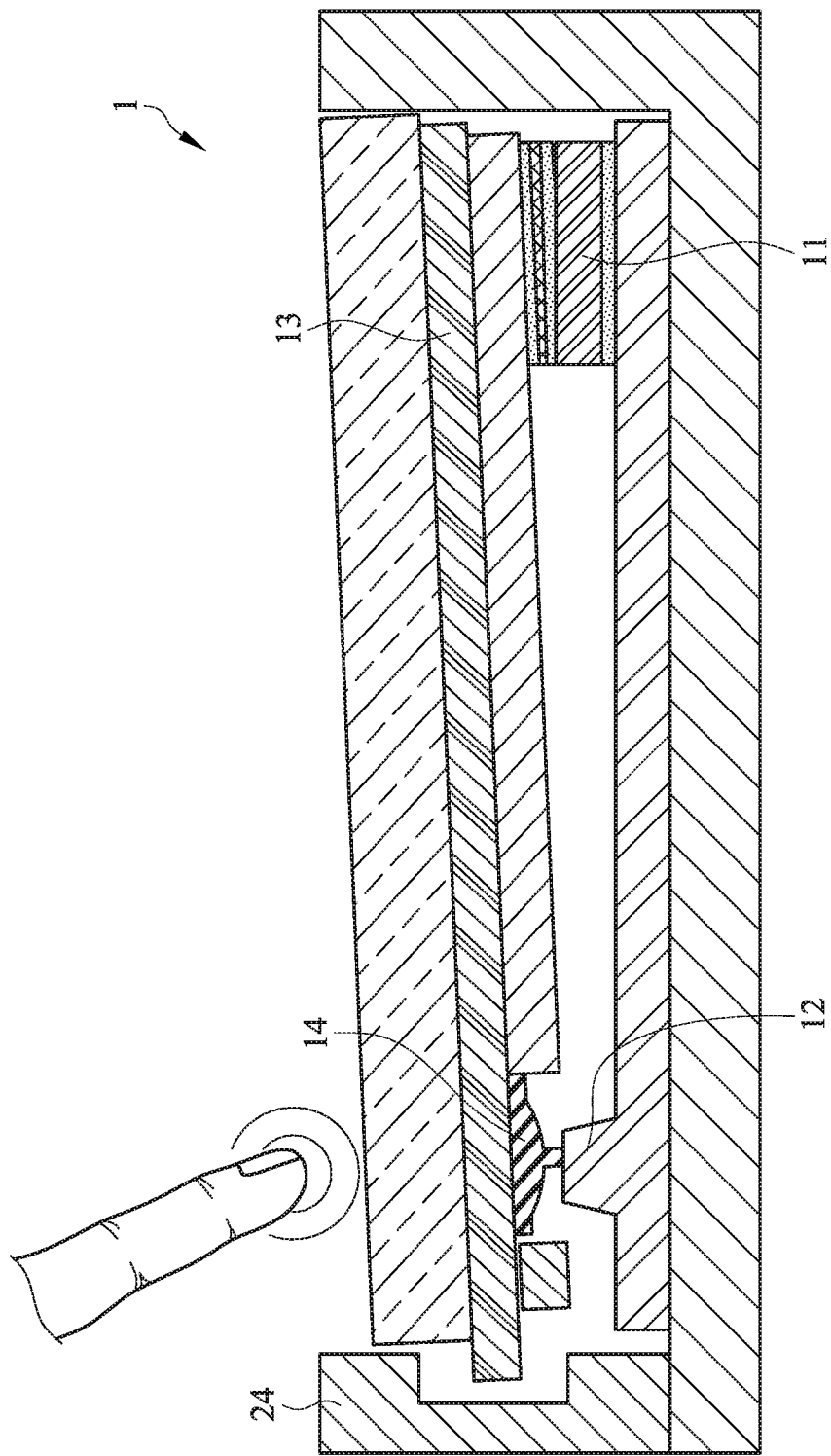
FIG. 3 is a schematic cross-sectional view illustrating the touchpad module as shown in FIG. 2, in which the touchpad module is pressed down.
Figure 4:
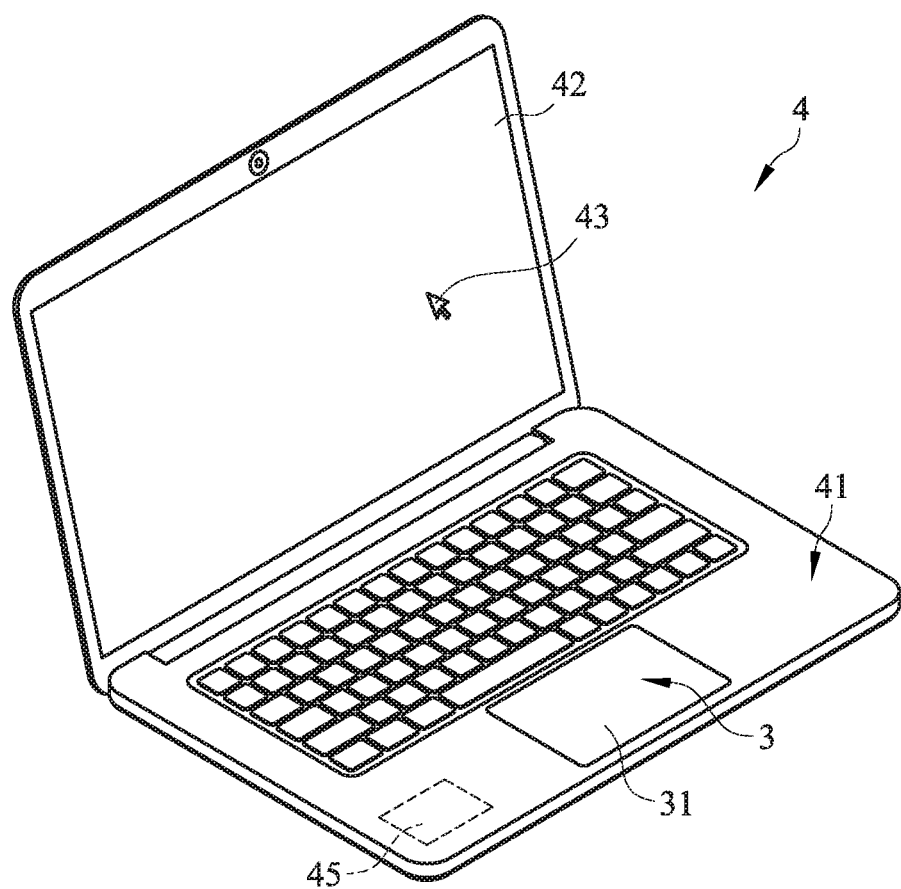
FIG. 4 is a schematic perspective view illustrating the outer appearance of a computing device with a touchpad module according to an embodiment of the present invention.

FIG. 4 is a schematic perspective view illustrating the outer appearance of a computing device with a touchpad module according to an embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. Moreover, the processor 41 is used for processing electronic signals of the computing device 4. Moreover, a fixing frame 44 is concavely formed in the casing 41 (see FIG. 5). The touchpad module 3 is disposed within the fixing frame 44 and electrically connected with the processor 45. In addition, at least a portion of the touchpad module 3 is exposed outside so as to be touched by the user's finger. Consequently, the user may operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed by the user's finger, the computing device 4 executes a specified function.

The other structure of the touchpad module 3 will be described in more details as follows.

Figure 5:
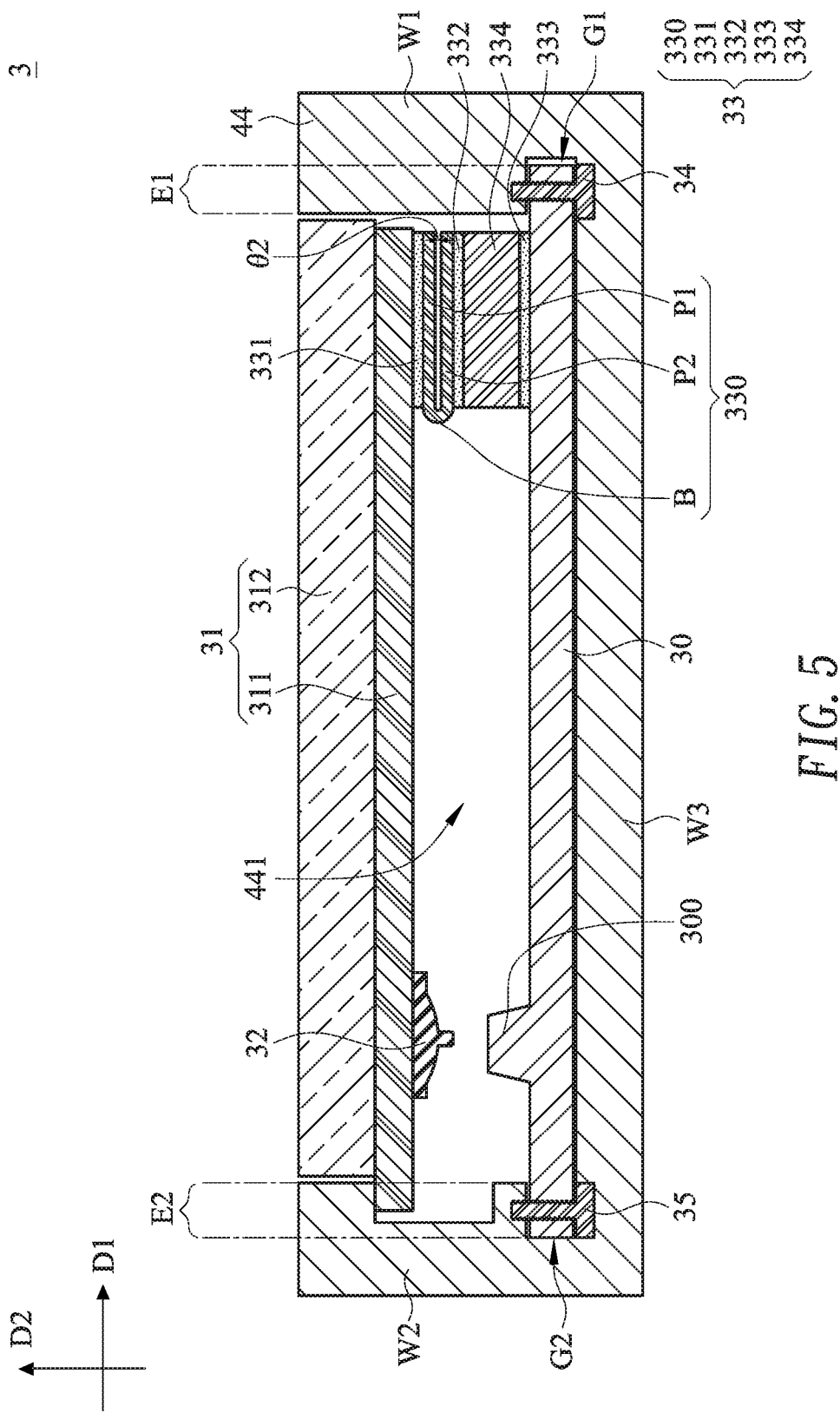
FIG. 5 is a schematic cross-sectional view illustrating portions of the fixing frame and the touchpad module of the computing device as shown in FIG. 4.

FIG. 5 is a schematic cross-sectional view illustrating portions of the fixing frame and the touchpad module of the computing device as shown in FIG. 4. The fixing frame 44 of the computing device 4 comprises an accommodation space 441. The touchpad module 3 is accommodated within the accommodation space 441. In an embodiment, the touchpad module 3 comprises a base plate 30, a touch member 31, a switch 32 and a supporting assembly 33. The base plate 30 is disposed within the fixing frame 44. The base plate 30 comprises a triggering part 300. The touch member 31 is disposed within the fixing frame 44. Moreover, the touch member 31 and the base plate 30 are opposed to each other. The switch 32 is disposed on the touch member 31 and aligned with the triggering part 300 of the base plate 30. That is, the switch 32 is disposed on a surface of the touch member 31 that faces the base plate 30. The supporting assembly 33 is arranged between the base plate 30 and the touch member 31. Moreover, the supporting assembly 33 is located beside a first side of the fixing frame 44, and the triggering part 300 of the base plate 30 is located beside a second side of the fixing frame 44.

In an embodiment, the supporting assembly 33 comprises an elastic element 330. The elastic element 330 comprises a first segment P1, a second segment P2 and a bent structure B. The bent structure B is arranged between the first segment P1 and the second segment P2. When an external force is exerted on the touchpad module 3, the touch member 31 is swung toward the base plate 30 by using the supporting assembly 33 as a fulcrum. As the touch member 31 is swung, the switch 32 on the touch member 31 is contacted with the triggering part 300 of the base plate 30 to issue an enabling signal to the computing device 4. According to the enabling signal, the computing device 4 executes a corresponding function. The detailed operations of the touchpad module 3 will be described later.

Please refer to FIG. 5 again. In this embodiment, the touch member 31 comprises a circuit board 311 and a covering plate 312. The covering plate 312 is located over the circuit board 311. The covering plate 312 and the circuit board 311 are combined together. The switch 32 is disposed on the surface of the circuit board 311 that faces the base plate 30. Preferably but not exclusively, the covering plate 312 is made of glass. It is noted that the material of the covering plate 312 may be varied according to the practical requirements.

Please refer to FIG. 5 again. The supporting assembly 33 further comprises a metallic supporting element 334. The metallic supporting element 334 is disposed on the base plate 30. Moreover, the metallic supporting element 334 is arranged between the base plate 30 and the elastic element 330. In this embodiment, the supporting assembly 33 further comprises a first adhesive layer 331, a second adhesive layer 332 and a third adhesive layer 333. Through the first adhesive layer 331, the first segment P1 of the elastic element 330 is adhered on the surface of the touch member 31 that faces the base plate 30. That is, the first segment P1 of the elastic element 330 is adhered on the surface of the circuit board 311 that faces the base plate 30. Through the second adhesive layer 332, the second segment P2 of the elastic element 330 is adhered on the surface of the metallic supporting element 334 that faces the touch member 31. Through the third adhesive layer 333, the metallic supporting element 334 is adhered on the surface of the base plate 30 that faces the touch member 31. Preferably but not exclusively, the first adhesive layer 331, the second adhesive layer 332 and the third adhesive layer 333 are pressure sensitive adhesives (PSA).

In an embodiment, the thickness of the metallic supporting element 334 of the supporting assembly 33 is 3.3 mm. As long as the metallic supporting element 334 is able to provide the sufficient supporting force, the thickness of the metallic supporting element 334 is not restricted. That is, the thickness of the metallic supporting element 334 may be varied according to the practical requirements.

In an embodiment, the elastic element 330 of the supporting assembly 33 is produced by bending a metal plate, and the thickness of the metal plate is 0.1 mm. As long as the metal plate is able to provide the sufficient supporting force, the thickness of the metal plate is not restricted. That is, the thickness of the metal plate may be varied according to the practical requirements.

Please refer to FIG. 5 again. The touchpad module 3 further comprises at least one fastening element (e.g., two fastening elements). In this embodiment, the touchpad module 3 comprises a first fastening element 34 and a second fastening element 35. The number of the at least one fastening element is not restricted and may be varied according to the practical requirements. In this embodiment, the base plate 30 is fixed on the fixing frame 44 of the computing device 4 through the first fastening element 34 and the second fastening element 35.

In this embodiment, the fixing frame 44 has a first lateral wall W1, a second lateral wall W2 and a bottom wall W3. The first lateral wall W1 and the second lateral wall W2 of the fixing frame 44 are opposed to each other. The bottom wall W3 of the fixing frame 44 is arranged between the first lateral wall W1 and the second lateral wall W2. Moreover, the first lateral wall W1 of the fixing frame 44 has a first recess G1, and the second lateral wall W2 of the fixing frame 44 has a second recess G2. The opening of the first recess G1 and the opening of the second recess G2 face the inner portion of the fixing frame 44. That is, the opening of the first recess G1 and the opening of the second recess G2 face each other. The base plate 30 of the touchpad module 3 is arranged between the bottom wall W3 of the fixing frame 44 and the touch member 31. The base plate 30 is extended along a first direction D1. Consequently, a first end part E1 and a second end part E2 of the base plate 30 are received within the first recess G1 and the second recess G2, respectively. The first fastening element 34 and the second fastening element 35 are tightened in the first lateral wall W1 and the second lateral wall W2 of the fixing frame 44 along a second direction D2. Consequently, the first end part E1 and the second end part E2 of the base plate 30 are fixed on the first lateral wall W1 and the second lateral wall W2 of the fixing frame 44, respectively. The first direction D1 and the second direction D2 are not in parallel with each other. Preferably but not exclusively, the first direction D1 and the second direction D2 are perpendicular to each other.

Hereinafter, the operations of the touchpad module 3 will be described in more details with reference to FIGS. 5 and 6.

Figure 6:
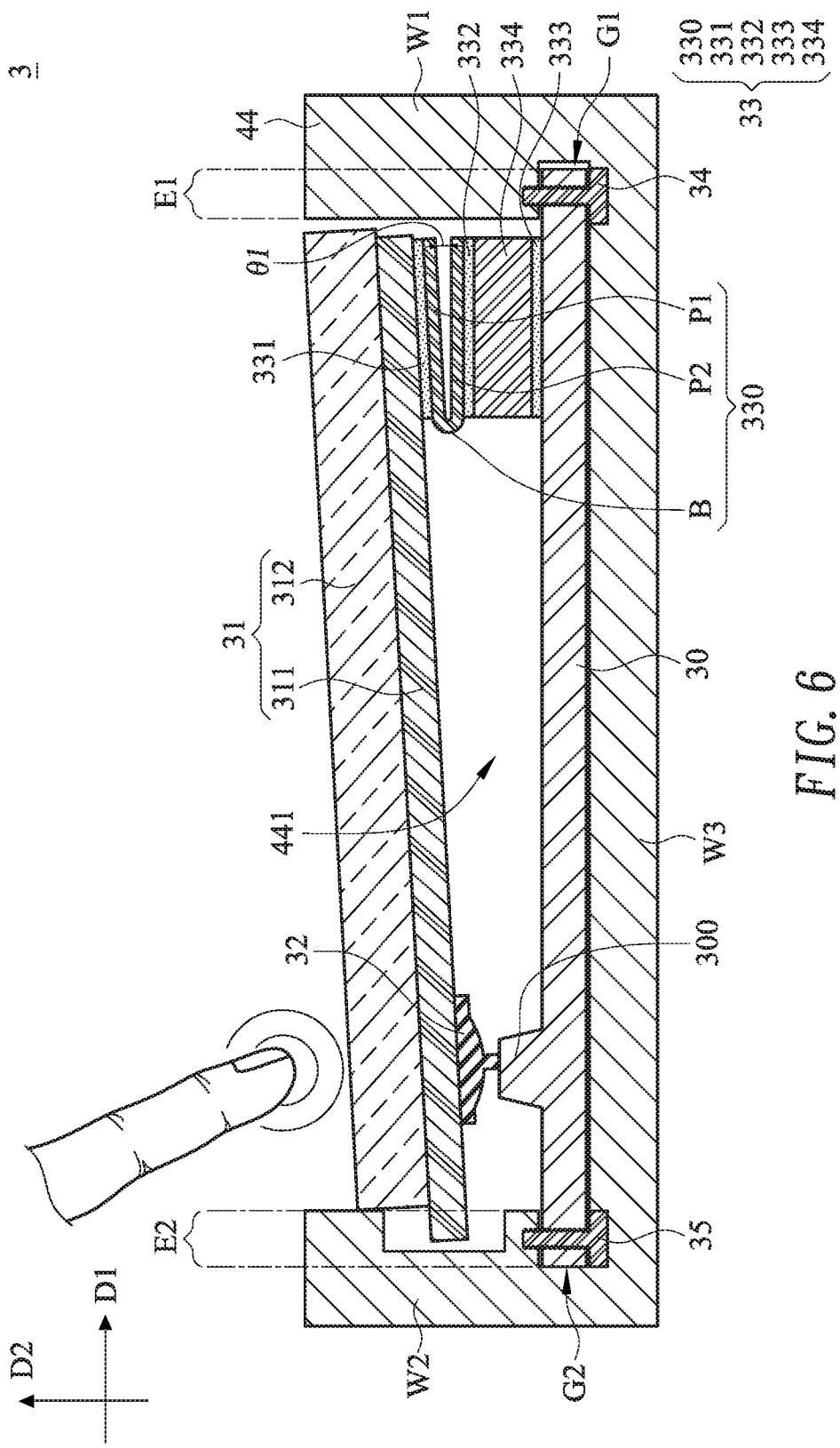
FIG. 6 is a schematic cross-sectional view illustrating the fixing frame and the touchpad module as shown in FIG. 5, in which an external force is exerted on the touchpad module.

FIG. 6 is a schematic cross-sectional view illustrating the fixing frame and the touchpad module as shown in FIG. 5, in which an external force is exerted on the touchpad module.

Please refer to FIG. 6. When an external force is exerted on the touchpad module 3, the touch member 31 of the touchpad module 3 is swung toward the base plate 30 by using the supporting assembly 33 as a fulcrum. Consequently, the switch 32 on the touch member 31 is contacted with the triggering part 300 of the base plate 30. While the touch member 31 is swung toward the base plate 30, the first segment P1 of the elastic element 330 is correspondingly moved in a direction away from the second segment P2 of the elastic element 300 by using the bent structure B as a fulcrum. Consequently, there is a first angle θ1 between the first segment P1 and the second segment P2, wherein the first angle θ1 is larger than 0 degree.

Please refer to FIG. 5 again. When the external force exerted on the touchpad module 3 is eliminated, in response to a restoring force of the elastic element 330, the first segment P1 of the elastic element 330 is moved toward the second segment P2 of the elastic element 300 by using the bent structure B as a fulcrum. Consequently, there is a second angle θ2 between the first segment P1 and the second segment P2. While the first segment P1 of the elastic element 330 is moved toward the second segment P2, the touch member 31 of the touchpad module 3 is swung away from the base plate 30 by using the supporting assembly 33 as the fulcrum. Consequently, the switch 32 on the touch member 31 is separated from the triggering part 300 of the base plate 30. The second angle θ2 is smaller than the first angle θ1.

In the embodiment as shown in FIG. 5, no external force is exerted on the touchpad module 3. Under this circumstance, the second angle θ2 between the first segment P1 and the second segment P2 of the triggering part 300 is 0 degree for example. That is, the first segment P1 and the second segment P2 of the triggering part 300 are in parallel with each other. It is noted that numerous modifications and alterations may be made while retaining the teachings of the invention. For example, in another embodiment, the second angle θ2 between the first segment P1 and the second segment P2 of the triggering part 300 is larger than 0 degree.

From the above descriptions, the present invention provides the touchpad module and the computing device with the touchpad module. The supporting assembly comprises a metallic supporting element and an elastic element. The elastic element comprises the first segment, the second segment and the bent structure. The elastic element is produced by bending a metal plate. Due to this structural design, the swinging action of the touch member with respect to the base plate by using the supporting assembly as the fulcrum is stable (i.e., not aslant). The components of the touchpad module (e.g., the metallic supporting element, the elastic element, the touch member and the base plate) are assembled by a gluing and stacking process. According to the analysis of a root sum square (RSS) method, the calculated value of the tolerance is smaller than 0.15. Moreover, the supporting assembly is attached on the base plate with the triggering part, and the base plate with the triggering part is fixed on the fixing frame of the computing device through the fastening element. Due to this structural design, the supporting assembly has a sufficient strength to withstand the deformation of the fixing frame of the computing device. Consequently, the height difference between the touch member and the fixing frame is not generated.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the computing device comprising a fixing frame, the touchpad module comprising:
   a base plate disposed within the fixing frame, and comprising a triggering part;
   a touch member disposed within the fixing frame, wherein the touch member and the base plate are opposed to each other;
   a switch disposed on the touch member and aligned with the triggering part of the base plate; and
   a supporting assembly arranged between the base plate and the touch member, and comprising an elastic element, wherein the elastic element comprises a first segment, a second segment and a bent structure between the first segment and the second segment,
   wherein in response to an external force, the touch member is swung toward the base plate by using the supporting assembly as a fulcrum, so that the switch is contacted with the triggering part, wherein while the touch member is swung toward the base plate, the first segment of the elastic element is correspondingly moved in a direction away from the second segment of the elastic element by using the bent structure as a fulcrum, so that there is a first angle between the first segment and the second segment.

2. The touchpad module according to claim 1, wherein when the external force exerted on the touchpad module is eliminated, in response to a restoring force of the elastic element, the first segment of the elastic element is swung toward the second segment of the elastic element by using the bent structure as the fulcrum, so that there is a second angle between the first segment and the second segment, wherein while the first segment of the elastic element is moved toward the second segment, the touch member of the touchpad module is swung away from the base plate by using the supporting assembly as the fulcrum, so that the switch is separated from the triggering part, wherein the second angle is smaller than the first angle.

3. The touchpad module according to claim 2, wherein the first angle is larger than 0 degree, and the second angle is larger than or equal to 0 degree.

4. The touchpad module according to claim 1, wherein the supporting assembly further comprises a metallic supporting element, wherein the metallic supporting element is disposed on the base plate, and the metallic supporting element is arranged between the base plate and the elastic element.

5. The touchpad module according to claim 4, wherein the supporting assembly further comprises a first adhesive layer, a second adhesive layer and a third adhesive layer, wherein the first segment of the elastic element is adhered on the touch member through the first adhesive layer, the second segment of the elastic element is adhered on the metallic supporting element through the second adhesive layer, and the metallic supporting element is adhered on the base plate through the third adhesive layer.

6. The touchpad module according to claim 4, wherein a thickness of the metallic supporting element is 3.3 mm.

7. The touchpad module according to claim 1, wherein the elastic element is produced by bending a metal plate, and a thickness of the metal plate is 0.1 mm.

8. The touchpad module according to claim 1, wherein the touchpad module further comprises at least one fastening element, and the base plate is fixed on the fixing frame through the at least one fastening element.

9. The touchpad module according to claim 8, wherein the fixing frame has a first lateral wall, a second lateral wall and a bottom wall, wherein the first lateral wall and the second lateral wall are opposed to each other, the bottom wall is arranged between the first lateral wall and the second lateral wall, the first lateral wall has a first recess, the second lateral wall has a second recess, the base plate is arranged between the bottom wall and the touch member, the base plate is extended along a first direction, and a first end part and a second end part of the base plate are received within the first recess and the second recess, respectively, wherein the at least fastening element comprises plural fastening elements, and a first fastening element and a second fastening element of the plural fastening elements are tightened in the first lateral wall and the second lateral wall of the fixing frame along a second direction, so that the first end part and the second end part of the base plate are respectively fixed on the first lateral wall and the second lateral wall, wherein the first direction and the second direction are not in parallel with each other.

10. The touchpad module according to claim 1, wherein the touch member comprises a circuit board and a covering plate, wherein the covering plate is located over the circuit board, and the switch is disposed on the circuit board.

11. A computing device, comprising:
   a casing, wherein a fixing frame is concavely formed in the casing;
   a processor disposed within the casing; and
   a touchpad module disposed within the casing and electrically connected with the processor, wherein the touchpad module comprises:
      a base plate disposed within the fixing frame, and comprising a triggering part;
      a touch member disposed within the fixing frame, wherein the touch member and the base plate are opposed to each other;
      a switch disposed on the touch member and aligned with the triggering part of the base plate; and
      a supporting assembly arranged between the base plate and the touch member, and comprising an elastic element, wherein the elastic element comprises a first segment, a second segment and a bent structure between the first segment and the second segment,
      wherein in response to an external force, the touch member is swung toward the base plate by using the supporting assembly as a fulcrum, so that the switch is contacted with the triggering part, wherein while the touch member is swung toward the base plate, the first segment of the elastic element is correspondingly moved in a direction away from the second segment of the elastic element by using the bent structure as a fulcrum, so that there is a first angle between the first segment and the second segment.

* * * * *